US006805467B2

(12) United States Patent
Wolf

(10) Patent No.: US 6,805,467 B2
(45) Date of Patent: Oct. 19, 2004

(54) EMERGENCY LASER ARRAY SIGNAL LIGHT

(75) Inventor: Edward A. Wolf, Dania Beach, FL (US)

(73) Assignee: ACR Electronics, Inc., Fort Lauderdale, FL (US)

( * ) Notice: Subject to any disclaimer, the term of this patent is extended or adjusted under 35 U.S.C. 154(b) by 21 days.

(21) Appl. No.: 10/064,480

(22) Filed: Jul. 18, 2002

(65) Prior Publication Data

US 2004/0012962 A1 Jan. 22, 2004

(51) Int. Cl.[7] .............................. F21K 7/00; F21V 13/04
(52) U.S. Cl. ........................ 362/259; 362/237; 362/241
(58) Field of Search ................................ 362/259, 237, 362/230, 231, 240, 241, 245, 246, 158, 184, 202, 109, 800, 244, 243, 242

(56) References Cited

U.S. PATENT DOCUMENTS 4,286,311 A * 8/1981 Maglica ...................... 362/205
6,481,870 B2 * 11/2002 Son ............................ 362/259
2003/0123254 A1 * 7/2003 Brass et al. .................. 362/231

\* cited by examiner

Primary Examiner—Thomas M. Sember
Assistant Examiner—Bao Q Truong
(74) Attorney, Agent, or Firm—Malin, Haley & DiMaggio, P.A.

(57) ABSTRACT

A portable emergency light for long range detection by flight and marine search and rescue personnel which utilizes a battery-powered laser array mounted and sealed within a waterproof housing to increase the effective intensity of a specific class laser. The laser array includes a plurality of laser light generators mounted together to project substantially along a common optical axis producing a signaling light. The search and rescue light may include a rotatable head for directing the signaling lights along a 360° plane and a three-dimensional gimbal which maintains the light beams in a level horizontal position so that the signaling lights may be easily projected along the entire horizon relative to the user. Each laser light generator is within US Government safety standards for the specific class laser despite the increased power of the signal. The laser array can be used with optical alignment lenses to form a desired highly visible light pattern.

20 Claims, 9 Drawing Sheets

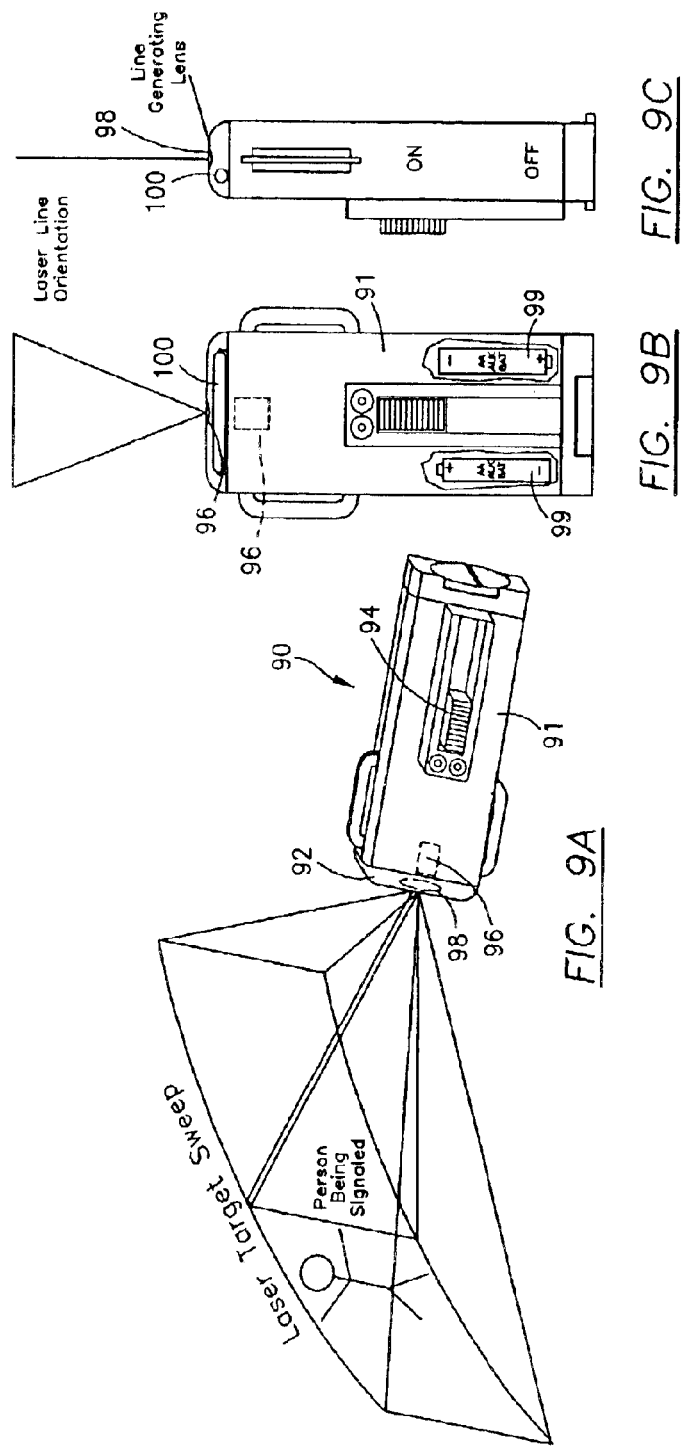

EMERGENCY LASER ARRAY SIGNAL LIGHT

BACKGROUND OF INVENTION

1. Field of the Invention

The present invention relates to any field that could benefit from a more powerful and more visible laser that has improved range. One specific field is the field of emergency search and rescue lights for use by imperiled individuals who are lost, and specifically to emergency rescue lights utilizing laser technology for enhancing visual detection by search and rescue (SAR) personnel in aircraft or marine vessels searching for an imperiled individual using the rescue light. The present invention provides an improved laser system that has increased power, visibility, and range, beyond what is presently in existence today for a particular class of laser. More specifically, a laser system in which the result is increased power, visibility, and range, without having laser radiation in excess of the accessible emission limits stated in 21 CFR Part 1040.10 for a particular class laser (e.g. a more powerful class I laser or a more powerful class IIIa laser).

2. Description of Related Art

Portable emergency rescue lights used by an imperiled person trying to be found typically utilize incandescent or strobe lights for visual detection and recognition by searching airborne or marine personnel. The illumination intensity of incandescent lights used in emergency signaling lights is often limited in time, range, and available power and can often be inadequate for detection and signaling purposes. Strobe lights can have a greater visual detection and illumination range than incandescent lights but also have intensity limits. Strobe lights are pulsed and not a steady beam of light. Strobe lights can often have a night blinding effect on the user and rescue personnel.

The light bulb power consumption and the amount of battery power available in a portable survival light limits the amount of "on" time and available watts in a survival scenario. The amount of battery time available for illumination can be a critical variable in a survival situation.

The present invention provides an improved portable, battery-powered survival light that does not employ either strobe or incandescent bulbs but instead uses a laser light source and laser generator. Advantages of laser light are beam focus, high light intensity and low power consumption. These advantages enable a laser light beam to be continuously visible at great distances for greater time periods. One drawback of using a class IIIa laser light in a search and rescue scenario is that the laser beam of light is so small that at long range, the visible beam area is small and must pinpoint the rescue aircraft or searching vessel; otherwise the laser light will not be seen by the searching personnel. A line generating lens may be used but the loss in intensity is too great. Another perceived drawback of the use of laser light is potential eye damage to users. U.S. Government regulations limit the maximum watt emission level of over-the-counter laser light products, which ensures a level of radiation below the accessible emission limits for a class IIIa laser.

The present invention provides a survival light of high intensity, low power consumption, and improved range visibility that complies with U.S. Government safety regulations for over-the-counter sales.

SUMMARY OF INVENTION

An emergency rescue light utilizing a plurality of laser light generators contained within a waterproof housing. The signal light includes multiple laser light generators, batteries, and a light circuit all of which are enclosed and sealed within a waterproof housing having a lens which allows light emitted from the enclosed laser light generators to pass through to the outside. In the preferred embodiment, off-the-shelf laser light beam generators that meet U.S. Government regulation for safety are used. For human optical safety reasons each laser light beam source cannot exceed the accessible emission limits contained in CFR 21 Part 1040.10 class IIIa laser(5 milliwatts in power).

Multiple laser light generators are mounted together and aligned substantially parallel to radiate individual light beams, all in substantially the same direction to form a laser array. The pattern generated by the laser array can be tightened (less space between beams) by the use of a prism, mirror or lens. Each of two laser light generators or more can be slightly angled towards the other so that the laser light beams emitted converge at a point at a fixed distance away from the laser array source (line of sight to the horizon) so that maximum combined total light energy is produced at a desired range, while not combining early enough to exceed the accessible emission limits for a specific class laser (e.g. one class IIIa laser). One or more lenses or reflective surfaces may also be used to spread the beam vertically, usually called a line-generating device. These techniques may be combined for maximizing the visibility of the laser signal to a distant person.

The laser arrays are enclosed by a waterproof housing that incorporates one or more transparent lenses, prisms, or mirrors. The multiple laser light beams emitted from the laser array are directed outwardly through one or more lenses, mirrors or prisms, which can provide optical convergence or divergence of the laser light beams producing desirable intensity patterns at a prescribed distance, such as line-of-sight (LOS) to the estimated horizon.

One or more batteries sufficient to energize the laser array are electrically connected and mounted within the housing. A power control circuit incorporating an on/off switch connects the laser light beam generators and batteries so that the laser light beam generators in the laser array may be energized by closing the switch.

In the preferred embodiment the waterproof housing includes a rigid base and a laser light support platform. The base is elongated, square and open at the top end. The light platform closes the open end of the base. The light platform incorporates a freely rotatable array cylinder attached to a mount head which contains a mirror and lens, that rotates 360°. The mirror is angled relative to the base so that laser light beams emitted from the laser array contained within the base are reflected to pass through the lens. A motor mounted within the base rotates the cylinder from within. The rotation allows the laser light beams reflected by the mirror to be projected 360 degrees horizontally so that the signaling/detecting light produced covers 360 degrees of the surrounding horizon when directed parallel to the ocean surface.

The light array control circuit is also connected to the rotating motor so that when the laser array is energized, the motor is also energized. The base encloses the motor, batteries and power control circuit and is sealed at the top end by the attachment of the light platform.

The entire waterproof light assembly may be mounted within a portable, handheld, two degree of freedom leveling gimbal. The housing is pivotally attached to an inner gimbal which is mounted within an outer gimbal so that the light assembly housing is maintained by gravity in a level horizontal position when held by the user or mounted on a vessel. A handle is attached to the outer gimbal to facilitate the operation of the signal light by one person. The motor rotates the cylinder effectively projecting the signaling light produced in a 360° horizontal pattern for maximum surface visibility.

In an emergency situation in the ocean, the user would typically be in a raft and would turn on the power switch and grasp the gimbal handle to allow the laser beam array to rotate parallel to the earth's surface for 360° rotation, covering the entire horizon. The gimbals keep the light array horizontal regardless of raft motion. The user could manually grasp the entire housing to override the gimbal and direct the light beam in a specific direction. Preferably, individually emitted laser light beams are each aligned relative to each other to converge roughly on the observable horizon relative to the user in the raft about eight miles from the user source (line of sight) for optimum light energy area distribution and sighting. The gimbals could include an engageable lock to permit manual manipulation of the device to aim the light array manually at a non-horizontal angle.

In an alternate embodiment of the invention, the laser light array is mounted within a flashlight housing formed by an elongated cylindrical body and a projection lens mounted head at one end. The elongated cylindrical body houses the batteries, power switch, and light circuit. A laser array of two or more laser light beam generators is housed and contained within the housing adjacent the lens head, transmitting light emitted from the laser generators to pass through the lens. Laser light beams emitted from the laser array are aligned, possibly using prisms, lenses or mirrors to project outwards through the lens substantially along a plurality of parallel axes distributed in a clustered pattern and through a lens for spreading the beam vertically, allowing the sweeping of the horizon with the signal.

The light beams emitted from the laser array may be parallel or may be individually angled relative to the optical array axis when passing through the transparent lens for controlling the total light energy in a greater area at a prescribed distance from the light source. The arrangement of the laser light beam generators may be adjusted to form a specific pattern. The lens can cause the multiple laser beams mounted parallel to each other to slightly converge or to diverge to cover a wider area at a distance from the source. From a low position above the earth's surface, such as a raft or small boat, the line-of-sight horizon is approximately 6 to 8 miles. The multiple light beams can be caused to diverge slightly so that at the LOS horizon, a larger area of the beams is observed. Conversely, the beams can be made to converge slightly for maximum light energy at the LOS horizon, but reduced beam area.

In yet another embodiment of the invention the laser light beams emitted from the laser array are each manipulated by a prism so that the laser light beams are aligned along a straight reference plane. The laser light sources are affixed together in a defined geometrical pattern, such as two rows of six lights each, and when used in conjunction with an optic lens, the resultant total beam can be controlled and oriented as to the width of the beam, the fantail or spread distance of the beam, and the spatial relationship of the individual light sources.

It is an object of this invention to provide an emergency rescue light that utilizes multiple laser light sources mounted together in a laser array to produce a rescue signal light easily detectable at great distances from the source while in compliance with U.S. Government regulations.

In accordance with these and other objects which will become apparent hereinafter, the instant invention will now be described with particular reference to the accompanying drawings.

BRIEF DESCRIPTION OF DRAWINGS

FIG. 9A shows perspectively and schematically an alternative embodiment of the invention.

FIG. 9B shows a back elevational view of the embodiment of FIG. 9A.

FIG. 9C shows a side elevational view of the embodiment of FIG. 9A.

DETAILED DESCRIPTION

Figure 1:
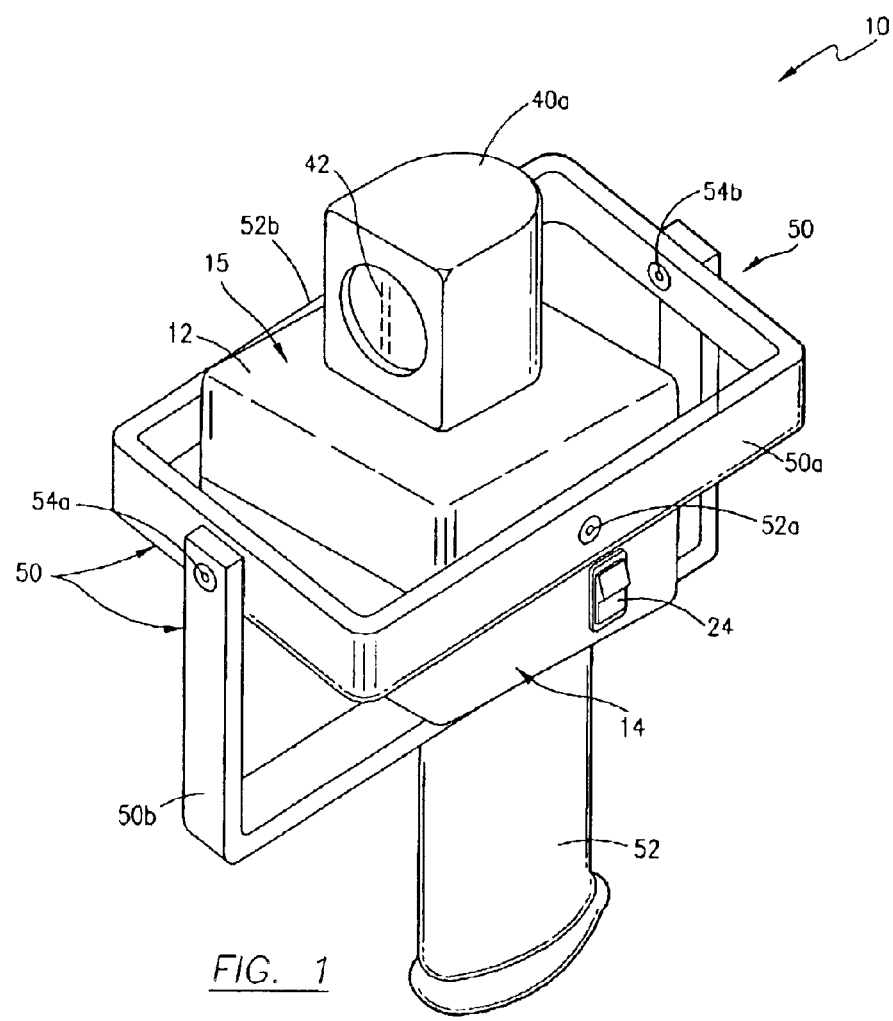
FIG. 1 is a perspective view of the preferred embodiment of the invention.

Referring now to the drawings, and more particularly to FIG. 1, the preferred embodiment of the invention 10 is shown. The rescue light 10 basically includes laser light beam generators 28 (shown in FIG. 2), housing 15, and gimbal assembly 50. Housing 15 is constructed from a rigid, plastic, rectangular base 14 attached to a laser light support platform 12. Base 14 is elongated and rectangular in shape and has an open top connected to base 14. Light support platform 12 attaches to base 14 using screw fasteners, glue or other suitable fastener for closing and providing a water tight seal around the open end of base 14. Base 14 and light support platform 12 may be made of a suitable durable rigid, waterproof material such as plastic, fiberglass or metal.

Housing 15 is supported by a two-dimensional or two-degree of freedom gimbal assembly 50 (including handle 52 connected to gimbal arm 50b) formed by an inner gimbal support 50a and an outer gimbal support 50b. Housing 15 is mounted within an inner gimbal 50a that encircles the housing 15 and housing 15 is pivotally attached at two opposing locations 52a and 52b so that the housing 15 may pivot freely within inner gimbal 50a about a first axis. Inner gimbal 50a is mounted within a fork-shaped outer gimbal 50b pivotally attached at two locations 54a and 54b so that inner gimbal 50a may pivot freely within outer gimbal 50b about a second axis which is perpendicular to the first axis. Both inner gimbal 50a and outer gimbal 50b may be constructed from a lightweight, rigid material such as aluminum, plastic or other suitable material sufficient to firmly support housing 15. Outer gimbal 50b is attached directly to handle 52.

Figure 2:
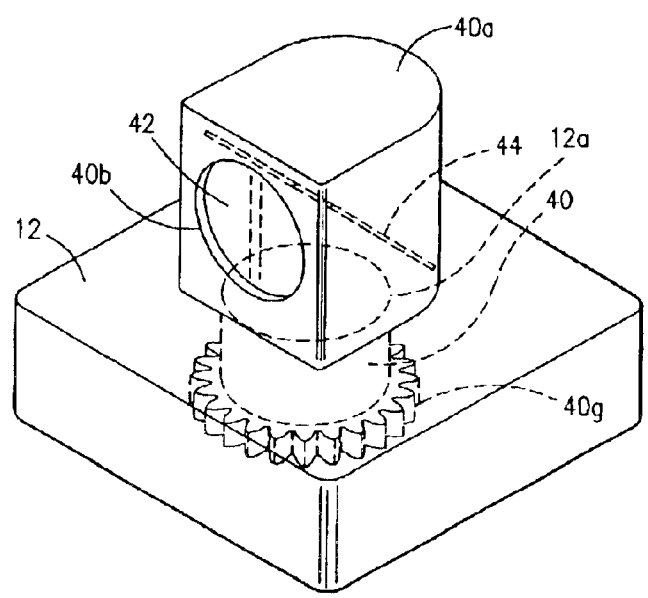
FIG. 2 is a partially exploded, perspective view of the preferred embodiment of the invention (shown without the gimbal and handles for clarity).
Figure 2:
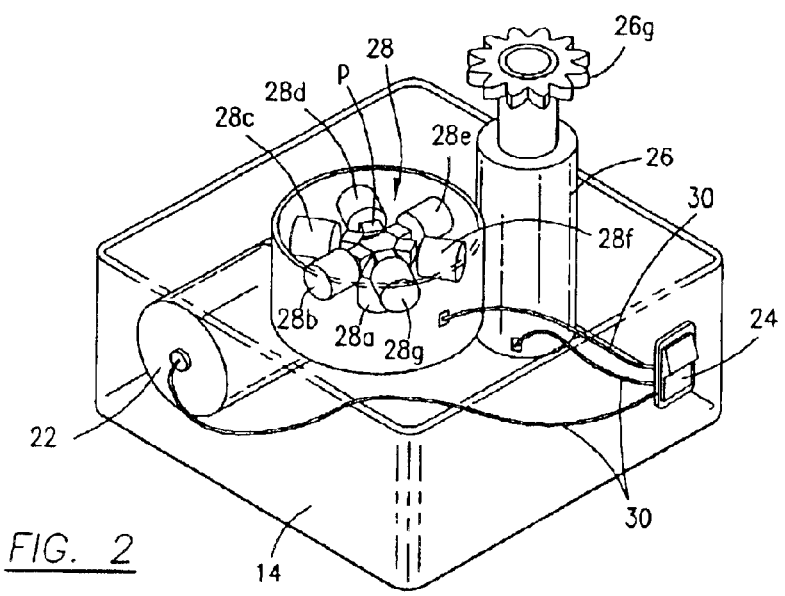

Referring now to FIG. 2, within base 14 are mounted battery 22, on/off power switch 24, DC-powered electric motor 26, laser array 28, and power control circuit 30. Multiple laser light beam generators 28a through 28g, each beam aligned with its own 90 degree prism p to redirect each laser beam 90 degrees are mounted together to form a seven laser generator array 28 which produces a high intensity rescue signal/detection light. Battery 22 is connected electrically to energize laser array 28 and motor 26. Power control circuit 30 is formed by conductive wires that electrically connect battery 22, on/off power switch 24, motor 26 and laser array 28 so that when switch 24 is closed, motor 26 and laser array 28 are energized. When energized, laser generator array 28 generates beams of laser light at a predetermined wavelength. Switch 24 is mounted for manual operation outside base 14.

A mount head 40a is attached to one end of a hollow light tube 40. Rigid hollow light tube 40 extends through a circular aperture 12a in light support platform 12 and is rotatably attached to light support platform 12 with a seal and bearings (not shown) so that the mount head 40a can be driven to rotate 360° relative to the upper surface of light support platform 12. A transparent, line generating lens 42 is mounted within an aperture 40b within mount head 40a which allows the laser light beams emitted from laser generator array 28 to be reflected by mirror 44 to be altered into a vertical line pattern by lens 42. Mirror 44 is mounted within mount head 40a adjacent to lens 42. Mirror 44 is mounted at a 45 degree angle with lens 42 so that laser light beams projected by laser array 28 through array cylinder 40 are reflected by mirror 44 to project out through lens 42. The rotation of array cylinder 40 by motor 26 and gear 26gallows the signaling light produced by laser array 28 to rotate and cover 360 degrees. Six laser light beam generators 28b, 28c, 28d, 28e, 28f and 28g are physically positioned facing inward in a circular array, each so that laser light rays or beams emitted by laser light beam sources 28b through 28g are directed by prisms p through circular aperture 12a. Laser generator 28a is the seventh laser generator and is positioned in the center of the array 28 facing upward (without a prism p) directing its beam through circular aperture 12a. The resultant tight cluster light beam pattern is reflected by mirror 44 and projects out through line generating lens 42, forming a vertically oriented, light line pattern about 100 feet high at a distance of about 8 miles from the source for enhanced detection by a boat on the ocean surface. The distance from the source and pattern of the light sources determine the cross-sectional area of the signaling/detection light, which is very important for visual detection miles away. The larger the cross-sectional area footprint, the greater area of exposure. Laser array 28 is mounted within base 14 relative to array cylinder 40 so that the signaling light beams projected by laser array 28 are directed through array cylinder 40 along an axis parallel to the axis of rotation of array cylinder 40. In operation, laser light beams are projected by laser array 28 through array cylinder 40 and reflected by mirror 44 through lens 42 along an axis parallel to the plane created by the top of light support platform 12. Each laser generator 28 through 28g is selected so that its power output does not exceed government safety requirements.

The distal end of array cylinder 40 (away from mount head 40a) has a cylinder peripheral gear 40g. The shaft of electric motor 26 is connected to a motor gear 26g of corresponding pitch that engages with the cylinder gear 40g. Electric motor 26 is mounted within base 14 and light support platform 12 such that motor gear 26g engages cylinder gear 40g, causing the motor 26 to rotate array cylinder 40 when energized. The 360° rotation of mount head 40 allows the projected light beams to radiate 360° along the horizon.

As shown in FIGS. 1 and 2, battery 22, laser array 28 and motor 26 are mounted within base 14 and light support platform 12 in a balanced arrangement so that when handle 52 is grasped by the user, the top of light support platform 12 is maintained in a level, horizontal position by gravity caused by the freedom of rotation about the first and second gimbal axes and the greater weight of the closed end of base 14 which contains battery 22, laser array 28 and motor 26.

Figure 3:
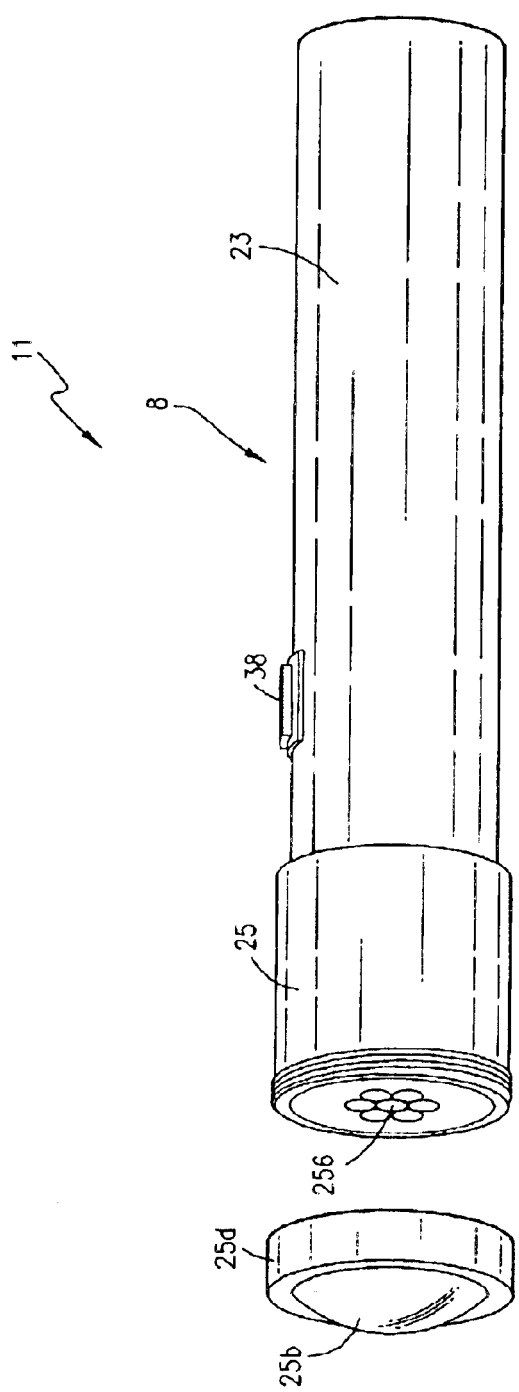
FIG. 3 is a perspective view of an alternate embodiment of the invention.
Figure 4:
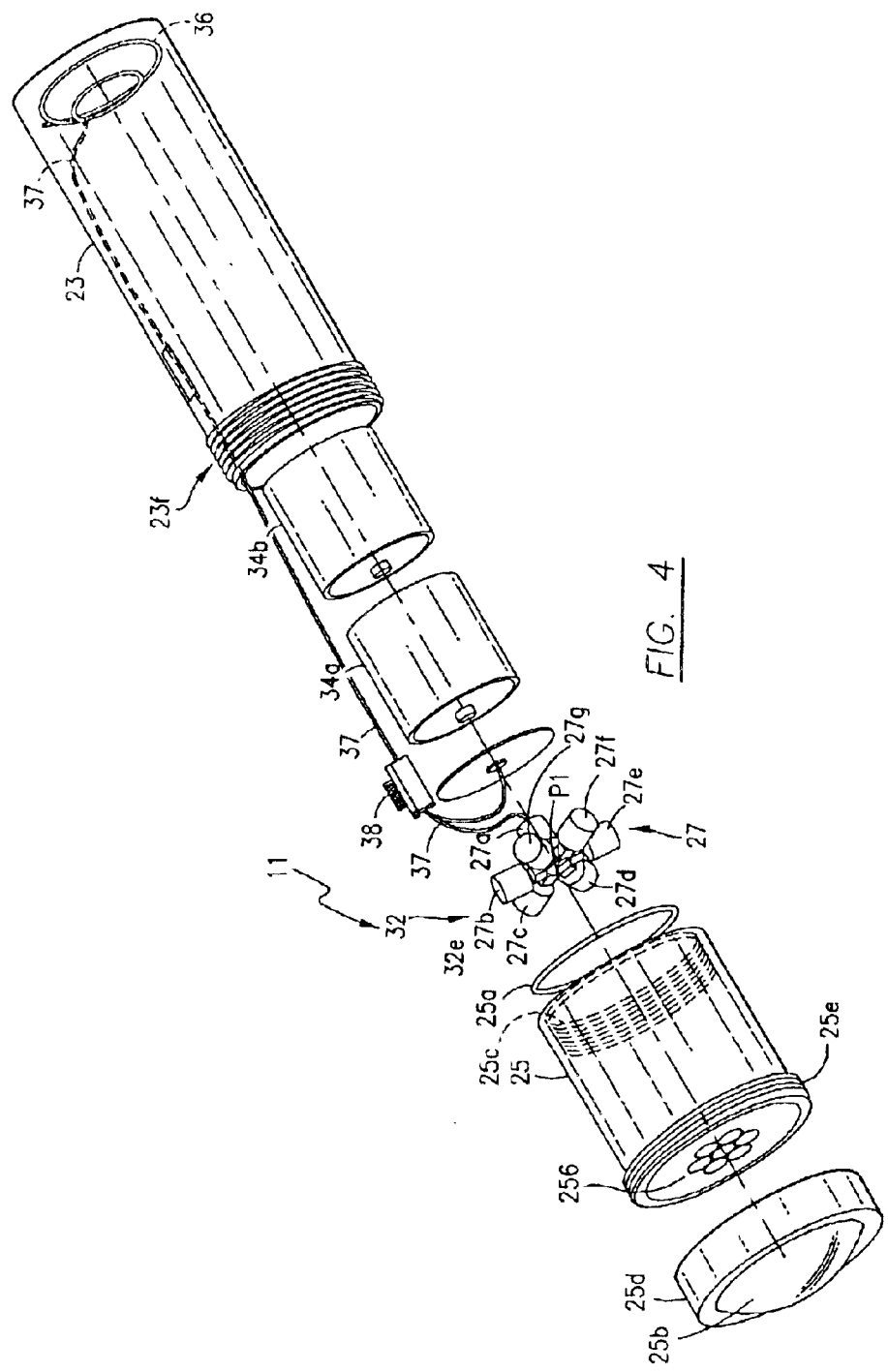
FIG. 4 is an exploded, perspective view of the alternate embodiment of the invention shown in FIG. 3.

Referring now to FIGS. 3 and 4, an alternate embodiment 11 of the invention is shown. Laser light beam generator array 27 (FIG. 4) is mounted in a tubular, hand-held, flashlight-like enclosure. The rescue light 11 basically includes a housing or enclosure 23 and a laser light beam generator array 27. Laser light beam generator array 27 is formed by multiple laser light generators 27a through 27g and prisms P1.

Rescue light 11 is made from a rigid, waterproof material such as plastic or metal. Rescue light 11 is formed by an elongated cylindrical body 23 and a removable projection head 25. Body 23 is open at the first end and closed at the second end. Body 23 encloses batteries 34a and 34b, a spring 36, an electrical power switch 38, and power array circuit 37. Batteries 34a and 34b are connected together electrically so that sufficient energy is produced to energize laser light beam array 27. Electrical power switch 38 is mounted for operation on the outside of body 23. Power array circuit 37 electrically connects batteries 34a and 34b with electric power switch 38 and laser light beam generator array 27 so that when electrical power switch 38 is closed, laser light beam generator array 27 is energized, generating beams of laser light at a predetermined wavelength. Projection head 25 is open at the first end and closed and sealed at the second end by projection lens 25b. Projection head 25 encloses laser light beam array 27 and right angle prisms P1 by threadable connection (threads 25c) to body 23. The outside surface of the opening of the first end of body 23 is adapted with fastening threads 23f. The inside surface of the first end of projection head 25 contains receiving threads 25c of the corresponding pitch to permit engagement with fastening threads 23f located at the first end of body 23. Further, the inside surface of the first end of projection head 25 contains a seat for accommodating o-ring seal 25a contained within. The outside surface of body 23 may be machined to provide a rough, grooved surface for easy gripping. Cap 25d screws on to head 25 at threads 25e and includes line forming lens 25b. Cap 25d and lens 25b are made water tight.

Rescue light 23 is assembled by engaging fastening threads 23f and receiving threads 25c and rotating projection head 25 until body 23 is sealed by projection head due to the compression of o-ring seal 25a between projection head 25 and handle 23. A seven laser light beam pattern 256 is represented at the opening of head 25 showing how the laser light beams are aligned in parallel with seven beams, six in a circular cluster with a seventh beam in the center. When these seven beams in array 256 pass through line forming lens 25b, a line or single band of laser light is produced. The laser generator array 27 is comprised of seven laser generators, six facing inward in a circular pattern, each with its own right angle prism P1 and a seventh in the center directing its beam toward lens 25b. The purpose is to provide a tight light pattern that is altered through circular cylinder lens 25b into a line which can be swept across the horizon or at an aircraft to aid in being detected by search and rescue crews miles away. The power of each laser generator in array 27 is selected to not exceed government safety requirements.

Line forming lens 25b receives light emitted from laser light beam array 27 contained within projection head 25 and creates a single line that can be 100 feet long at eight miles. Laser light beam generator array 27 is mounted and positioned within projection head 25 so that the individual laser light beams emitted by laser generator array 27 are directed away from the second end of body 23 substantially parallel to an optical axis which is parallel with said body 23 through projection lens 25b.

Referring to FIG. 3, rescue light 11 is shown fully assembled except for cap 25d and lens 25b. In use, the rescue light 11 resembles a conventional flashlight on the outside. A user may energize laser light beam generator array 27 by closing electrical power switch 38 and sweeping the rescue light 11 across the horizon or in the direction of searching aircraft or ships so that the signaling light beam array produced can be spotted by searching individuals. The light beam pattern and distance spacing may be the same as the preferred embodiment above, being five or seven separate beams in a cluster with a line-generating lens.

Figure 5:
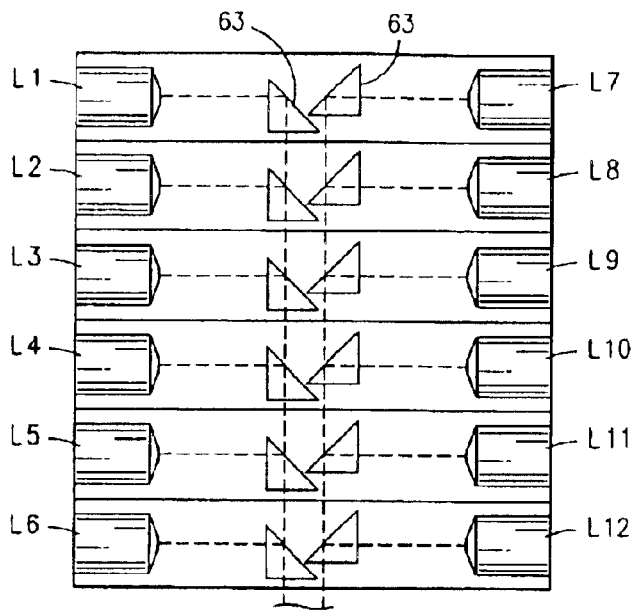
FIG. 5 shows a schematic diagram (top plan view) using twelve laser light sources each in conjunction with its own single alignment right angle prism in order to alter the resultant total light beam formed by the lasers into a tight pattern of parallel beams.
Figure 6:
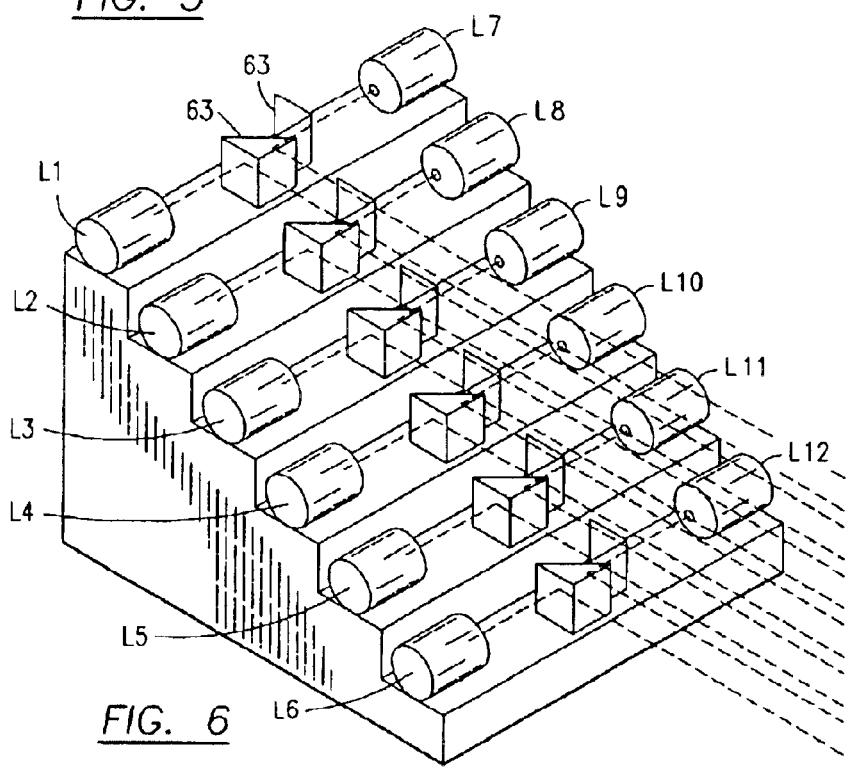
FIG. 6 shows a perspective view of the device schematically represented in FIG. 5.

Referring now to FIGS. 5 and 6, another embodiment of the laser beam array is shown having twelve separate laser light generators (L1–L12) arranged to have each of their beams pass through right angle prisms 63. Each laser light generator is a specific class laser (e.g. Class IIIa laser) disposed substantially in two linear lines adjacent to each other. This is illustrative that the laser light generators have thickness and therefore the projected laser light beams can not be brought into close alignment when the laser light sources are grouped together to form the array. The desired effect is to create a laser light beam pattern that in two dimensions extends far from the source, such as from the ground, vertically, while being quite thin horizontally for intensity purposes.

Figure 7A:
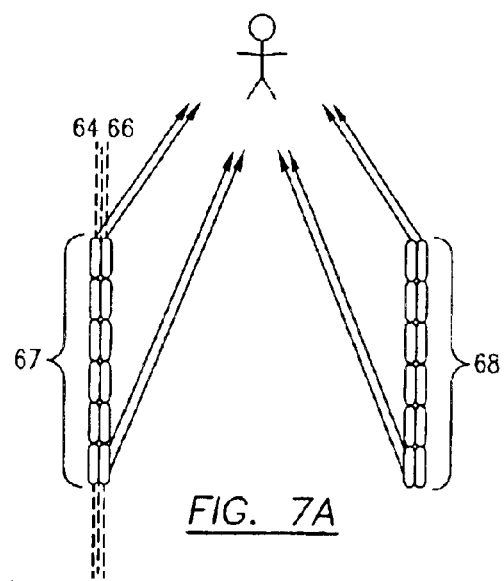
FIG. 7A shows a schematic diagram of two of the initial laser light arrays shown in FIG. 5 converging prior to altering the resultant laser pattern through a lens or reflector for use in any of the embodiments listed.

FIG. 7A shows the desired arrangement of the laser light generators as shown in FIGS. 5 and 6 where laser light beams are projected along essentially two vertical axes 64 and 66. The twelve laser light beams 67 converge with twelve laser light beams 68 about eight miles out to double the intensity and make up for attenuation losses over the specified distance. The desired result is a taller and wider pattern being used to pass through a line generating lens or reflector (not shown) which produces a vertical sweep line which can extend from the horizon (ground or ocean surface) vertically several hundred feet. The final result of using an array as shown in FIGS. 5, 6 and 7A, is to allow a taller and wider light pattern with more power to be elongated through a line generating lens or reflector producing for example a 100 foot vertical sweep line on the horizon with essentially 12 times the power than if one class IIIa laser was manipulated. Adding an additional twelve laser system to converge 8 miles away doubles that to twenty four times the power as shown in FIG. 7A. However, government limitations on laser power is not exceeded.

Figure 7B:
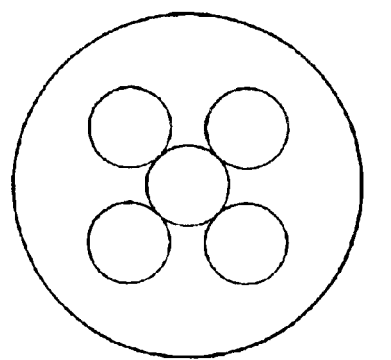
FIGS. 7B and 7C show two schematic diagrams, the former showing a beam pattern array with five lasers and the latter a beam pattern with 7 lasers.
Figure 7C:
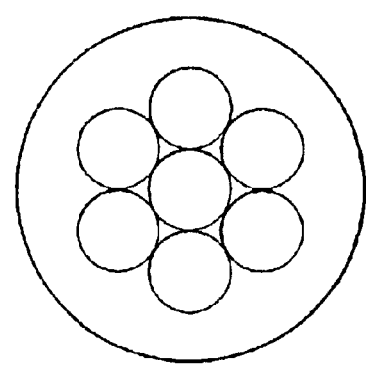

FIGS. 7B and 7C show laser patterns (clusters) (five or seven laser sources) that can be altered for use, as in the preferred embodiment.

Figure 8A:
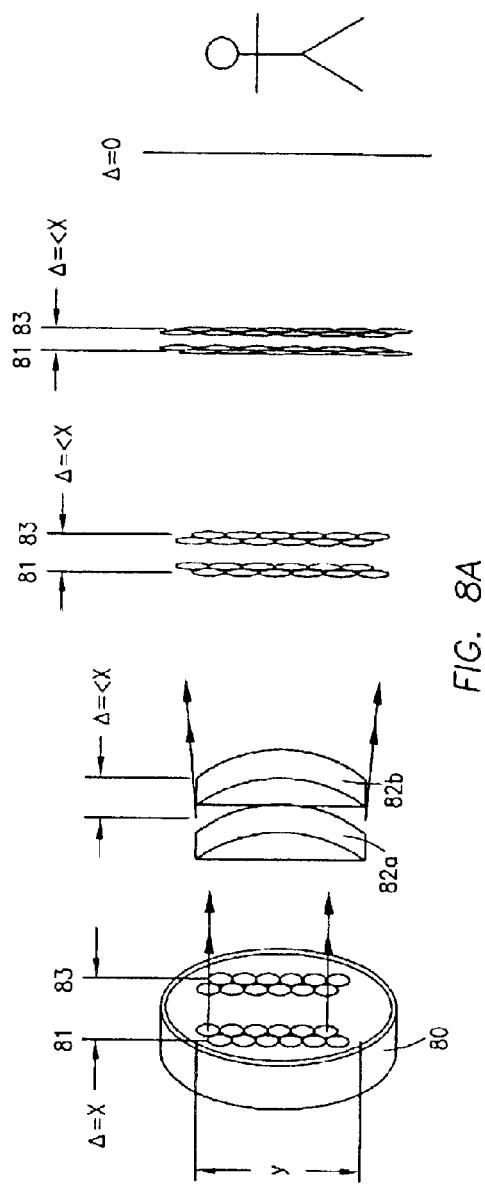
FIG. 8A shows a schematic diagram illustrating the preferred light pattern array from the laser array shown in FIG. 6 with the addition of line forming lenses for a vertical spread a certain distance away, most likely 8 or so miles for the second preferred embodiment.

FIG. 8A shows how the results of FIGS. 5 and 6 can be used to create a signaling vertical line with increased visibility. This allows people in boats or aircraft to see the laser or light beams at great distances. FIG. 8A shows a scenario where two slightly converging separate multiple arrays 81 and 83 of laser light beams are mounted vertically in separate units as shown in FIGS. 5 and 6. The beams 81 and 83 are separated at distance X at the initial transmission point through cap 80. The pair of line generating lenses 82a and 82b receive the light beams 81 and 83 and are spaced apart by amount less than "x". The individual light beams spaced vertically 81 and 83 are then transmitted through space and are on a converging course such that at approximately eight miles away (or a desired distance to be set based upon the horizon or other variable), an observer will be at a point where the actual beam separation is zero. This means that of the multiple beams transmitted, all of the energy is now concentrated into a single thick line of light that is visible eight miles away, representing the sum total of each individual laser generator, each generator of which is at or below government safety levels as to the power permissible.

Figure 8B:
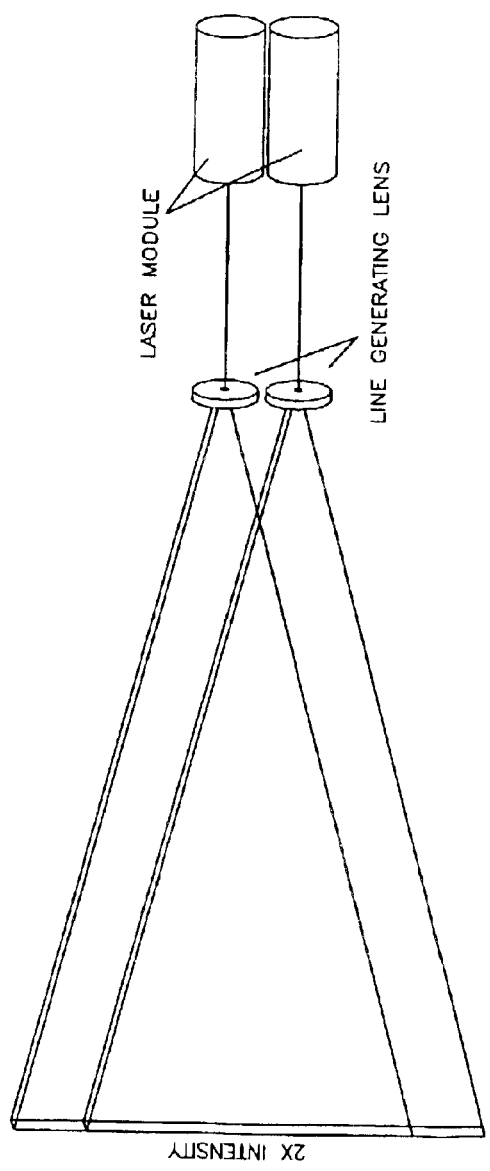
FIG. 8B shows a schematic diagram of the interaction of two separate laser beams, each acted on by a line forming lens, the two beams overlap to form a single beam having two times the intensity at a distance from the laser generators to form a vertical line.

FIG. 8B shows two individual laser beam generator modules and rays and two line generating lenses for schematic representation to provide twice the intensity along the single line at a distance spaced away from the laser modules. Using the structure, and mounting the two laser modules in conjunction with line generating lenses in this manner, the advantage of using individual laser generator modules that are at or below the government safety levels can be combined in a way that safely allow for using the light intensity that is attenuated miles away from the laser modules and where intensity is inversely proportional to the length of the line generated. This will get the maximum benefit out of laser modules of a pre-determined power output.

Another alternate embodiment of the invention is shown in FIG. 9A. In this embodiment, a small portable rectangular hand-held, water-proof, plastic housing 90 includes a strobe light mounted under a clear plastic lens 92 and at least one laser light generator 96, that includes a line forming lens 98. The dual acting power switch is shown at 94. This embodiment has two modes of operation, one in which a strobe light 100 is illuminated that flashes for emergency purposes and a second mode where a laser light beam is generated that forms a vertical or single line that can be oriented vertically for search and rescue purposes as already described herein. Looking at FIGS. 9B and 9C, the device includes a pair of batteries 99 mounted inside a waterproof housing 91 and a strobe light 100 which is connected to the batteries through switch 94 as is the laser generator 96 and a line forming lens 98. The switch 94 may have two positions, one for the strobe light and one for the laser light. Also, both laser and strobe lights could be illuminated at the same time, if necessary. The purpose of the invention shown in FIGS. 9A, 9B and 9C would be for search and rescue or survival to attract attention in order to be located, whether a person is in the ocean or on land. The laser beam is used for signaling in a vertical laser beam line that shows in FIG. 9A a target sweep where one would manually move the laser beam in a horizontal direction to sweep an area where one might find search and rescue crews. The strobe light is also useful for attracting attention from miles away. The operation of the strobe light 100 by itself is convention and does not form a part of the invention.

In alternate embodiments, different shaped lenses, mirrors and prisms can be employed that allow for the diversion, dispersion, addition or fanning out of laser light beams to create a desired end result approximately eight to ten miles or other desired distance from the light source. Light beams could be caused to converge eight or more miles away at the theoretical horizon from someone in a small craft or small elevated boat to get more energy directionally positioned at the horizon, creating a pattern which is easier to spot by personnel that are looking for the light source.

With the preferred embodiment light patterns and the particular housings shown in the invention, the ultimate purpose is to create a more powerful laser illumination system without exceeding the government designated safe class of each laser used. This laser system allows one to be found from someone that is lost in a body of water, or on land, and to attract the attention of a search party either in boats or aircraft. The use of multiple laser arrays, which have increased effective intensity, especially in conjunction with the use of one or more lenses, mirrors, and reflective prisms, can greatly increase the coverage area while at the same time extending the time that the light is available because of the reduced power consumption for the amount of light energy obtained using the laser sources. This is enhanced when altering the source using lenses, mirrors, and prisms creating light patterns which can be seen at greater distances, increasing the probability of being found.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An emergency signal light system comprised of two or more lasers configured to provide an effect of a more powerful single laser using laser alignment so that the lasers are superimposed on each other or next to each other and comprising:

a laser light beam array formed by mounting together substantially parallel a plurality of laser light generators which project more than one laser light beam in substantially the same direction relative to a common optical axis;

an electrical power source connected to each of said laser light beam generators for powering said generators;

a laser light beam array electrical circuit connecting said power source and each of said laser generators;

an electrical on/off switch connected to said electrical circuit for turning said laser generators on and off;

a housing, said laser light beam array, electrical power source and electrical on/off switch mounted within said housing; and a light beam optical manipulation device which allows laser light beams emitted from said laser light beam array to pass through and outside said housing so that said laser light beams form a predetermined pattern at a defined distance from said laser light generators.

2. The laser light of claim 1 wherein said laser light generators are off the shelf laser light sources that meet U.S. Government safety regulations of 5 milliwatts or less.

3. The laser light of claim 1 wherein said light beam manipulation device includes a line forming beam pattern.

4. The emergency light of claim 3 having a means for rotatably projecting light emitted from said laser light beam array along a 360° plane.

5. An emergency light as in claim 4 wherein said means for projecting light emitted from said laser light beam array along a 360° plane is an array cylinder;

said base open at one end and closed at the opposite end, said base enclosing said batteries, said light circuit and a motor, said motor connected to said light circuit so that when said switch is closed said motor is energized, said switch mounted within said base so that it is operable from outside said base;

said array cylinder extending through said light platform, said array cylinder rotatably attached to said light platform so that it rotates freely about an axis which is perpendicular to the plane created by the top of said light platform;

said base open end closed and sealed by the attachment of said light platform, said laser array disposed within said base so that light beams emitted from said laser array are directed through said array cylinder along an axis perpendicular to the plane created by the top of said light platform and reflected by said mirror;

said array cylinder adapted with cylinder gears along the end contained within said base, said motor adapted with motor gears for engaging said cylinder gears, said motor mounted within said base so that said motor gears engage said cylinder gears when said light platform is attached to said base, said motor rotates said array cylinder from within said base when energized;

a two-degree of freedom gimbal including an inner gimbal and an outer gimbal; and said housing pivotally mounted within said inner gimbal supporting said housing and pivotal about a first axis, said inner gimbal mounted within said outer gimbal supporting said inner gimbal and pivotal about a second axis which is perpendicular to said first axis, said housing arranged within said inner and outer gimbal so that said housing is maintained in a level horizontal position due to gravity.

6. The emergency signal light of claim 3 wherein said light beam manipulation device includes a lens and said housing includes an elongated, tubular, cylindrical member and a projection head, said member open at the first end and closed at the second end, said projection head open at the first end and closed and sealed at the second end by said lens;

said electrical power source including at least one battery;

said member enclosing said at least one battery and said power circuit, said switch mounted within said member so that said laser generators are operable from outside said member;

the outside of said member having fastening threads at the first end, the inside surface of said first end of said projection head having receiving threads of a corresponding pitch to permit engagement with said fastening threads of said member said projection head having a seat which accommodates an o-ring seal;

an o-ring seal connected to said projection head;

said projection head closing and sealing said member by engagement of said fastening threads and said receiving threads and compression of said o-ring seal;

said laser array disposed within said projection head so that light beams emitted from said laser array are directed along an optical axis parallel to said member through said lens and away from said second end of said member.

7. An emergency signal light system comprised of two or more lasers configured to provide an effect of a more powerful single laser using laser alignment so that the lasers are superimposed on each other or next to each other and comprising:
   a laser light beam array formed by mounting together substantially parallel a plurality of laser light generators which project more than one laser light beam in substantially the same direction relative to a common optical axis;
   an electrical power source connected to each of said laser light beam generators for powering said generators;
   a laser light beam array electrical circuit connecting said power source and each of said laser generators;
   an electrical on/off switch connected to said electrical circuit for turning said laser generators on and off;
   a housing, said laser light beam array, electrical power source and electrical on/off switch mounted within said housing;
   a light beam optical manipulation device which allows laser light beams emitted from said laser light beam array to pass through and outside said housing so that said laser light beams form a predetermined pattern at a defined distance from said laser light generators;
   said laser light generators are off the shelf laser light sources that meet U.S. Government safety regulations of 5 milliwatts or less; and
   said laser light beams emitted by said laser light generators are altered using an optical alignment means, so that said laser light beams are aligned along a signal plane parallel to one another.

8. The emergency signal light of claim 7 wherein a laser light pattern emitted by said laser light generators pass through an optical lens so that said aligned laser light pattern is caused to diverge so that at a distance 8 miles away said laser light pattern spreads out to a height of approximately 100 feet.

9. The emergency light of claim 8 having a means for projecting light emitted from said laser light beam array along a 360° plane.

10. An emergency light as in claim 9 wherein said means for projecting light emitted from said laser light beam array along a 360° plane is an array cylinder;
   said base open at one end and closed at the opposite end, said base enclosing said batteries, said light circuit and a motor, said motor connected to said light circuit so that when said switch is closed said motor is energized, said switch mounted within said base so that it is operable from outside said base;
   said array cylinder extending through said light platform, said array cylinder rotatably attached to said light platform so that it may rotate freely about an axis which is perpendicular to the plane created by the top of said light platform, said array cylinder containing and housing said lens and a mirror, said lens adapted so that light beams emitted from said laser array may pass through with or without influence;
   said base open end closed and sealed by the attachment of said light platform, said laser array disposed within said base so that light beams emitted from said laser array are directed through said array cylinder along an axis perpendicular to the plane created by the top of said light platform and reflected out through said lens by said mirror;
   said array cylinder adapted with cylinder gears or other suitable rotating means along the end contained within said base, said motor adapted with motor gears or other suitable rotating means for engaging said cylinder gears, said motor mounted within said base so that said motor gears engage said cylinder gears when said light platform is attached to said base, said motor rotates said array cylinder from within said base when energized;
   said housing pivotally mounted within an inner gimbal supporting said housing and pivotal about a first axis, said inner gimbal mounted within an outer gimbal supporting said inner gimbal and pivotal about a second axis which is perpendicular to said first axis, said housing arranged within said inner and outer gimbal so that said housing is maintained in a level horizontal position due to the pendulum effect.

11. The emergency signal light of claim 7 wherein said light beam optical manipulator includes a lens and said power source includes at least one battery and said housing includes an elongated cylindrical handle and a projection head, said handle open at the first end and closed at the second end, said projection head open at the first end and closed and sealed at the second end by said lens;
   said handle enclosing said batteries and said power circuit, said switch mounted within said handle so that it is operable from outside said handle;
   the outside of said handle having fastening threads at the first end, the inside surface of said first end of said projection head having receiving threads of a corresponding pitch to permit engagement with said fastening threads of said handle, said projection head having a seat which accommodates an o-ring seal;
   said projection head closing and sealing said handle by engagement of said fastening threads and said receiving threads and compression of said o-ring seal;
   said laser array disposed within said projection head so that light beams emitted from said laser array are directed along an optical axis parallel to said handle through said lens and away from said second end of said handle.

12. The emergency light of claim 3 having a means for projecting light emitted from said laser light beam array along a 360° plane.

13. An emergency light as in claim 12 wherein said means for projecting light emitted from said laser light beam array along a 360° plane is an array cylinder;
   said base open at one end and closed at the opposite end, said base enclosing said batteries, said light circuit and a motor, said motor connected to said light circuit so that when said switch is closed said motor is energized, said switch mounted within said base so that it is operable from outside said base;
   said array cylinder extending through said light platform, said array cylinder rotatably attached to said light platform so that it may rotate freely about an axis which is perpendicular to the plane created by the top of said light platform, said array cylinder containing and housing said lens and a mirror, said lens adapted so that light beams emitted from said laser array may pass through with or without influence;
   said base open end closed and sealed by the attachment of said light platform, said laser array disposed within said base so that light beams emitted from said laser array are directed through said array cylinder along an axis perpendicular to the plane created by the top of said light platform and reflected out through said lens by said mirror;
   said array cylinder adapted with cylinder gears or other suitable rotating means along the end contained within said base, said motor adapted with motor gears or other suitable rotating means for engaging said cylinder gears, said motor mounted within said base so that said motor gears engage said cylinder gears when said light platform is attached to said base, said motor rotates said array cylinder from within said base when energized;

said housing pivotally mounted within an inner gimbal supporting said housing and pivotal about a first axis, said inner gimbal mounted within an outer gimbal supporting said inner gimbal and pivotal about a second axis which is perpendicular to said first axis, said housing arranged within said inner and outer gimbal so that said housing is maintained in a level horizontal position due to the pendulum effect.

14. The emergency signal light of claim 3 wherein said light beam optical manipulator includes a lens, said power source includes at least one battery, and said housing includes an elongated cylindrical handle and a projection head, said handle open at the first end and closed at the second end, said projection head open at the first end and closed and sealed at the second end by said lens;

said handle enclosing said batteries and said power circuit, said switch mounted within said handle so that said laser generators are operable from outside said handle;

the outside of said handle having fastening threads at the first end, the inside surface of said first end of said projection head having receiving threads of a corresponding pitch to permit engagement with said fastening threads of said handle, said projection head having a seat which accommodates an o-ring seal;

said projection head closing and sealing said handle by engagement of said fastening threads and said receiving threads and compression of said o-ring seal;

said laser array disposed within said projection head so that light beams emitted from said laser array are directed along an optical axis parallel to said handle through said lens and away from said second end of said handle.

15. The emergency signal light of claim 13 wherein said lens is adapted to cause light emitted from said laser light generators to diverge from said optical axis.

16. The emergency signal light of claim 15 wherein said lens is adapted to cause light emitted from said laser light generators to diverge from said optical axis.

17. The emergency signal light of claim 1, wherein said housing is waterproof.

18. The emergency signal light of claim 7, wherein said optical alignment means is a prism.

19. The emergency signal light of claim 7, wherein said optical alignment means is a reflector.

20. The emergency signal light of claim 7, wherein said optical alignment means is a lens.

* * * * *